US008094407B2

(12) United States Patent
Cherubini et al.

(10) Patent No.: US 8,094,407 B2
(45) Date of Patent: Jan. 10, 2012

(54) SERVOMECHANISM WITH ADJUSTABLE PREDICTOR FILTER

(75) Inventors: Giovanni Cherubini, Rueschlikon (CH);
Jens Jelitto, Rueschlikon (CH);
Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 12/543,339

(22) Filed: Aug. 18, 2009

(65) Prior Publication Data

US 2011/0043945 A1 Feb. 24, 2011

(51) Int. Cl.
*G11B 5/584* (2006.01)
*G11B 15/46* (2006.01)

(52) U.S. Cl. .................... 360/77.12; 360/73.04

(58) Field of Classification Search .............. None
See application file for complete search history.

(56) References Cited

U.S. PATENT DOCUMENTS

| 4,685,005 | A | 8/1987 | Fields, Jr. |
| 6,082,653 | A | 7/2000 | Abedor et al. |
| 6,282,051 | B1 | 8/2001 | Albrecht et al. |
| 6,545,836 | B1 | 4/2003 | Ioannou et al. |
| 6,762,900 | B2 | 7/2004 | Bui et al. |
| 6,791,781 | B2 | 9/2004 | Bui et al. |
| 6,940,682 | B2 | 9/2005 | Bui et al. |
| 7,002,763 | B2 | 2/2006 | Bui et al. |
| 7,245,450 | B1 | 7/2007 | Cherubini et al. |
| 7,881,009 | B2 * | 2/2011 | Cherubini .................. 360/78.04 |

OTHER PUBLICATIONS

Guo-Ping Cai et al., "A Discrete Optimal Control Method for a Flexible Cantilever Beam with Time Delay", Journal of Vibration and Control, vol. 12, No. 5, 2006, pp. 509-526.
D.B. Richards et al., "Key issues in the design of magnetic tapes for linear systems of high track density", IEEE Transactions on Magnetics, vol. 34, Issue 4, Part 1, Jul. 1998, pp. 1878-1882.
E.R. Childers et al., "Six orders of magnitude in linear tape technology: The one-terabyte project", IBM Journal of Research and Development, vol. 47, No. 4, Jul. 2003, pp. 471-482.
N. Abe et al., "Smith Predictor Control and Internal Model Control—A Tutorial—", SICE Annual Conference in Fukui, Japan, Aug. 4-6, 2003, pp. 1383-1387.
Anthony D. Alfano et al., "New technique for monitoring lateral tape motion using a magnetic signal", Microsyst Technol, Jan. 2006, pp. 565-570.
R.G. Biskeborn et al., "Hard-disk-drive technology flat heads for linear tape recording", IBM Journal of Research and Development, vol. 47, No. 4, Jul. 2003, pp. 385-400.

* cited by examiner

*Primary Examiner* — Andrew L Sniezek
(74) *Attorney, Agent, or Firm* — Van N. Nguy

(57) ABSTRACT

A digital control system, and in particular a tape drive system having a track-following servomechanism with a predictor (also referred to herein as a predictor filter), is described. In certain embodiments, the servomechanism includes an actuator, a servo channel, and a predictor coupled to the servo channel. The predictor receives from the servo channel a lateral position estimate signal and determines a modified lateral position estimate signal that reduces a difference, introduced by a tape velocity-dependent delay, e.g., introduced by the servo channel, between the modified lateral position estimate signal and an actual lateral position. The modified lateral position estimate may be used to modify a control signal sent to the actuator.

15 Claims, 11 Drawing Sheets

SERVOMECHANISM WITH ADJUSTABLE PREDICTOR FILTER

FIELD OF THE INVENTION

This disclosure relates generally to digital control systems, and in particular to tape drive systems having a track-following servomechanism with a predictor filter.

BACKGROUND

Since the 1950s, tape has persisted as the media of choice when inexpensive and reliable data storage is required. The roles played by tape include data interchange, processing, and storage; today tape serves generally as a media for archiving and backup. Progress in tape technology has resulted from substantial advances in channel, head, drive, and tape. Moreover, the cost of tape storage, normalized per unit capacity (dollars per gigabyte), has decreased steadily over time driven primarily by advances in areal density and reduction in tape thickness.

Areal density is a two-dimensional measurement obtained as the product of linear density and track density. Linear density is a measure of how tightly bits are packed longitudinally along a length of tape. Increases in linear density tend to lead to an increase in intersymbol-interference (ISI), unless corrected. Track density is a measure of how tightly tracks are packed laterally on the tape. Increases in track density implies narrower track width, narrower write/read heads, and closer head spacing, all of which tend to lead to losses in signal-to-noise ratio (SNR), unless corrected. Increasing linear densities beyond those achieved by state-of-the-art tape systems is becoming difficult. Improving track density may therefore provide further improvements in areal density.

BRIEF SUMMARY

Embodiments of the invention provide a track-following servomechanism for a tape drive system, the servomechanism including: an actuator coupled to a head module housing at least one servo reader, the actuator configured to actuate motion of the head module based on a control signal u(t); a servo channel coupled to the servo reader, the servo channel configured to receive from the servo reader a servo signal s(t) and configured to determine, based on the servo signal s(t), a lateral position estimate signal y(t) representing a lateral position estimate of the servo reader and a tape velocity estimate signal v(t) representing longitudinal velocity of a tape, wherein the servo channel introduces a tape velocity-dependent delay $\tau(v)$ into the lateral position estimate signal y(t); a predictor filter coupled to the servo channel, the predictor filter configured to receive from the servo channel the lateral position estimate signal y(t) and the tape velocity estimate signal v(t), wherein the predictor filter determines a modified lateral position estimate signal ŷ(t) that reduces a difference, introduced by the tape velocity-dependent delay $\tau(v)$, between the modified lateral position estimate signal ŷ(t) and an actual lateral position; and a compensator coupled to the predictor filter and the actuator, the compensator configured to modify the control signal u(t) based upon the modified lateral position estimate signal ŷ(t). The servomechanism may also include a bypass route coupling the servo channel to the compensator, the bypass route bypassing the predictor filter; and a switch coupled to the servo channel, the bypass route, and the predictor filter, wherein the switch is configured to transmit the lateral position estimate signal y(t) along the bypass route when the tape velocity estimate signal v(t) indicates the velocity of the tape is at or above a threshold velocity and configured to transmit the lateral position estimate signal y(t) to the predictor filter when the tape velocity estimate signal v(t) indicates the velocity of the tape is below the threshold velocity. The predictor filter may be a Kalman filter.

Embodiments of the invention also provide a track-following servomechanism for a tape drive system, the servomechanism including: a digital-to-analog converter (DAC) configured to receive a digital control signal $u_d(t)$, convert the digital control signal $u_d(t)$ to an analog control signal $u_a(t)$, and output the analog control signal $u_a(t)$; an actuator coupled to the DAC and coupled to a head module housing at least one servo reader, the actuator configured to receive from the DAC the analog control signal $u_a(t)$ and to actuate motion of the head module based on the analog control signal $u_a(t)$; a servo channel coupled to the servo reader, the servo channel configured to receive from the servo reader a servo signal s(t), and the servo channel configured to output a lateral position estimate signal y(t) representing a lateral position estimate of the servo reader and a tape velocity estimate signal v(t) representing longitudinal velocity of a tape; a Kalman filter coupled to the servo channel, the Kalman filter configured to receive from the servo channel the lateral position estimate signal y(t) and the tape velocity estimate signal v(t), and to receive the digital control signal $u_d(t)$, and the Kalman filter configured to output an estimate of an augmented actuator state signal $\hat{x}_{aug}(t)$, and a modified lateral position estimate signal ŷ(t); a controller coupled to the servo channel and the Kalman filter, the controller configured to receive from the servo channel the tape velocity estimate signal v(t) and receive from the Kalman filter the estimate of the augmented actuator state signal $\hat{x}_{aug}(t)$, and the controller configured to output an augmented control signal $u_{aug}(t)$; a subtractor coupled to the Kalman filter, the subtractor configured to receive from the Kalman filter the modified lateral position estimate signal ŷ(t), and the subtractor configured to output a difference between a reference signal r(t) and the modified lateral position estimate signal ŷ(t) as a modified error signal ê(t); a compensator coupled to the subtractor, the compensator configured to receive from the subtractor the modified error signal ê(t), and the compensator configured to output a preliminary digital control signal $u_{d0}(t)$; and an adder coupled to the compensator, the controller, the DAC, and the Kalman filter, the adder configured to receive from the compensator the preliminary digital control signal $u_{d0}(t)$ and from the controller the augmented control signal $u_{aug}(t)$, and the adder configured to output to the DAC and to the Kalman filter the digital control signal $u_d(t)$. The servo channel may be equivalent to a first-order low-pass filter having a variable time constant that varies based on a tape velocity-dependent delay $\tau(v)$.

Embodiments of the invention also provide a method for determining parameters of a Kalman filter of a track-following servomechanism for a tape drive system, the method including: identifying a particular tape velocity above a threshold velocity; using the particular velocity, determining parameters of a proportional-integral-derivative (PID) compensator of a servomechanism; selecting a set of tape velocities, wherein each velocity in the set is less than or equal to the threshold velocity; and at each velocity in the set of tape velocities, determining parameters of a Kalman filter of the servomechanism based on the parameters of the compensator. The threshold velocity may be 1.6 m/s. The method may further include, when the servomechanism is in a tape drive system having digital speed matching enabled, during operation of the servomechanism, selecting parameters for the Kalman filter based on linear interpolation for tape velocities between velocities of the set.

Embodiments of the invention also provide a method for determining parameters of a track-following servomechanism for a tape drive system having a proportional-integral-derivative (PID) compensator, a Kalman filter, and a linear quadratic Gaussian (LQG) controller, the method including: identifying a range of tape velocities; identifying a process noise standard deviation from a corresponding lateral position output for all velocities within the range; identifying a measurement noise standard deviation from a corresponding lateral position output for all velocities within the range; identifying weighted norms that characterize a deviation of an overall closed-loop response from a desired transfer characteristic, a contribution of process noise to a lateral position signal, and a contribution of measurement noise to the lateral position signal; for a given velocity above a threshold velocity, determining parameters for a proportional-integral-derivative (PID) compensator that minimize a sum of the weighted norms; based on a tape velocity-dependent delay $\tau(v)$, the process noise standard deviation, and the measurement noise standard deviation, determining parameters for a Kalman filter for each tape velocity within a predetermined set of tape velocities; and based on the tape velocity-dependent delay $\tau(v)$, determining parameters for a linear quadratic Gaussian (LQG) controller for each tape velocity within a predetermined set of tape velocities. The range of tape velocities may be 0.6 m/s-1.6 m/s.

Embodiments of the invention also provide a method for operating a servomechanism in a tape drive system, the method including: receiving a servo signal s(t) from a servo reader; based on the servo signal s(t), determining a lateral position estimate y(t) of the servo reader; based on the servo signal s(t), determining a velocity estimate v(t) of a tape being read by the servo reader; identifying a tape velocity based on the velocity estimate v(t); if the tape velocity is above a threshold velocity, feeding back the lateral position estimate y(t) to a compensator; if the tape velocity is below the threshold velocity, wherein the threshold velocity is a velocity at which a non-negligible tape velocity-dependent delay $\tau(v)$ is introduced into the lateral position estimate signal y(t), transmitting the lateral position estimate y(t) to a predictor filter, wherein the predictor filter determines a modified lateral position estimate signal $\hat{y}(t)$ that reduces or minimizes a difference, introduced by the tape velocity-dependent delay $\tau(v)$, between the modified lateral position estimate signal $\hat{y}(t)$ and an actual lateral position, and transmitting the modified lateral position estimate signal $\hat{y}(t)$ to the compensator; and outputting from the compensator a control signal for an actuator coupled to the servo reader.

Embodiments of the invention further provide a digital control system including: a sensor module including at least one sensor and an associated parameter module, wherein the at least one sensor is configured to sense an attribute of a physical object, and wherein the associated parameter module is configured to determine an observable system parameter associated with the physical object and affecting the attribute, and wherein the sensor module is configured to provide a feedback signal based on the attribute and a signal representing the observable system parameter, and wherein the sensor module is to introduce in the feedback signal a delay dependent on the observable system parameter; a predictor filter coupled to the sensor module, the predictor filter configured to receive from the sensor module the feedback signal and the signal representing the observable system parameter, wherein the predictor filter is further configured to determine a modified feedback signal that reduces a difference, introduced by the delay dependent on the observable system parameter, between the modified feedback signal and an actual physical attribute; and a compensator coupled to the predictor filter, the compensator configured to modify a control signal u(t) based upon the modified feedback signal. The predictor filter may be a Kalman filter. The attribute of the physical object may be a position of the physical object and the observable system parameter associated with the physical object may be a velocity of the physical object.

BRIEF DESCRIPTION OF THE DRAWINGS

Embodiments of the invention are described by way of example with reference to the accompanying drawings wherein.

DETAILED DESCRIPTION OF THE INVENTION

Figure 1:
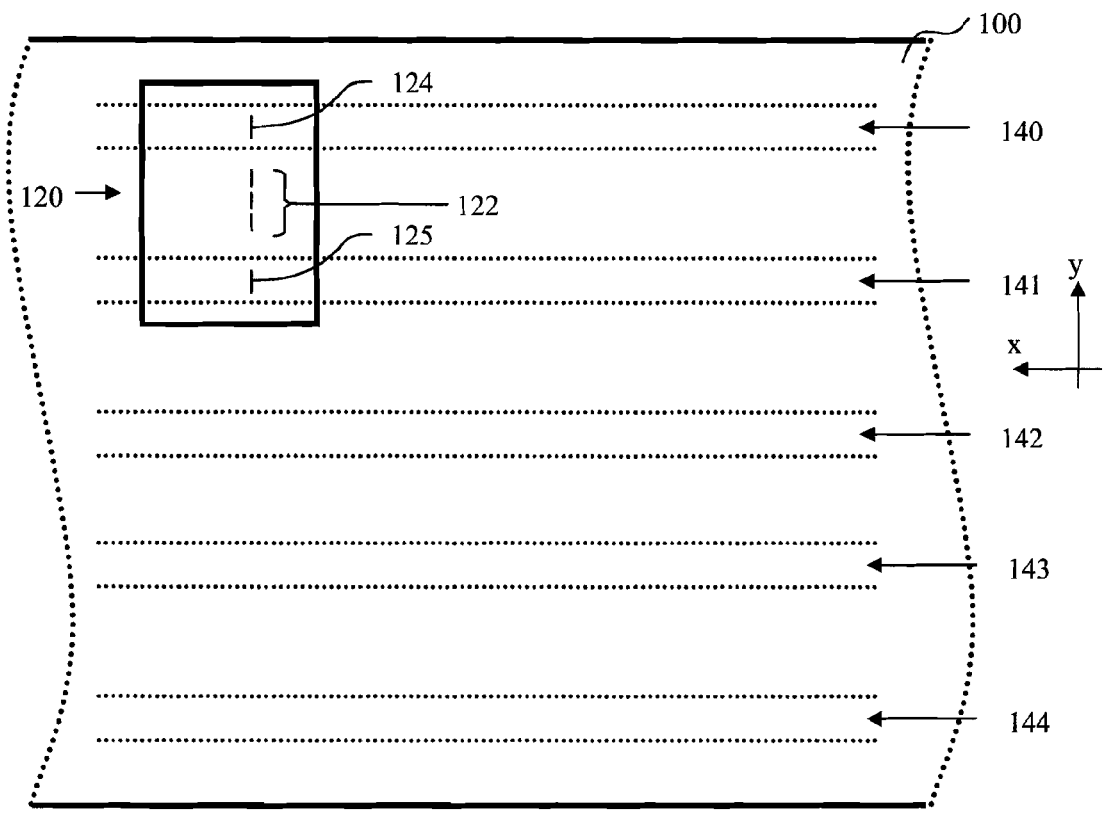
FIG. 1 is a schematic representation of a tape head and a segment of a linear data storage tape with a plurality of separate servo bands in accordance with embodiments of the invention.

Historically, tape has had to bear the burden of legacy products while semiconductor memory (SCM) and hard disk drives (HDD) faced no such burden. In view of the legacy burden of tape, a Linear Tape-Open®† (LTO®) specification was designed to allow backward-compatible improvements. Linear data storage tape is a medium for storing typically large amounts of data. In use, linear data storage tape includes a plurality of data tracks extending longitudinally (lengthwise) along the tape. Common examples of linear data storage tape include magnetic tape media and optical tape media. A tape head is employed for reading and/or writing data on the data tracks. The tape head is typically shared between various data tracks or groups of data tracks, and is moved between tracks or groups of tracks in a lateral direction relative to the tape. In magnetic tape media, the tape head typically includes a number of separate elements which read and/or write data with respect to a number of parallel tracks.

† Linear Tape-Open and LTO are registered trademarks of International Business Machines Corporation, Hewlett-Packard Corporation, and Seagate Corporation in the United States, other countries, or both.

The tape head is typically provided with one or more separate servo read transducers, laterally offset from the read and/or write elements, so as to track follow a servo band. The servo read transducers enable the read and/or write elements of the tape head to be guided along the data track(s). The LTO adopted a timing-based servo (or timing based servoing) (TBS) format for linear tape systems. Timing-based servoing refers to a method in which duration between pulses from obliquely written patterns provides information used to determine a tape's lateral and longitudinal position relative to a head module. The TBS format provides for dedicated servo signals that can be viewed as pilot signals from which both precise longitudinal position information and precise lateral position information can be extracted. The value of being able to extract even more precise lateral position information increases as track density increases. In optical tape media, an optical servo may be associated with an individual data track or with a separate servo track.

In one embodiment of the invention, a track-following servomechanism for a tape drive system includes an actuator, a servo channel, a predictor (e.g., a Kalman filter), and a compensator. (Herein, the term "predictor" and "predictor filter" are used interchangeably.) The actuator is coupled to a head module housing at least one servo reader. The head module houses the servo reader(s) by providing physical support for the servo reader(s), such as, for example, by having the servo reader(s) mounted on the head module, by protecting the servo reader(s) on two or more sides, and/or by having the servo reader(s) located within the head module. The servo reader is coupled to the servo channel, which is coupled to the predictor. The predictor is coupled to the compensator, which couples back to the actuator. The actuator is configured to actuate motion of the head module based on a control signal $u(t)$. The servo channel is configured to receive a servo signal $s(t)$ from the servo reader. The servo channel is configured to determine, based on the servo signal $s(t)$, a lateral position estimate signal $y(t)$ and a tape velocity estimate signal $v(t)$. The lateral position estimate signal represents a lateral position of the servo reader. The tape velocity estimate signal represents longitudinal velocity of a tape being read/written by the tape drive system. The servo channel introduces a tape velocity-dependent delay $\tau(v)$ into the lateral position estimate signal $y(t)$. The predictor, which is configured to receive from the servo channel the lateral position estimate signal $y(t)$ and the tape velocity estimate signal $v(t)$, determines a modified lateral position estimate signal $\hat{y}(t)$ that reduces or minimizes the difference, introduced by the tape velocity-dependent delay $\tau(v)$, between the modified lateral position estimate signal $\hat{y}(t)$ and an actual lateral position. This modified lateral position estimate signal $\hat{y}(t)$ is provided to the compensator. The compensator modifies the control signal $u(t)$ based upon the modified lateral position estimate signal $\hat{y}(t)$.

Accordingly, the effects of the velocity-dependent delay $\tau(v)$ are mitigated by incorporation of a predictor (e.g., a Kalman filter) that can be readily optimized for certain applications by adjusting parameters of the predictor. As further described herein, in one embodiment, a gain scheduling technique is used to determine coefficients of the predictor in case of drive operations where a variable tape velocity is required, e.g., when digital speed matching is enabled. In certain embodiments, the predictor is also applied to mitigate effects of computational delays introduced by further processing of the lateral position estimates. Thus, embodiments of the invention provide optimal prediction of an actuator state even in the presence of a velocity-dependent delay that is introduced by a servo channel into lateral position estimates, and/or computational delays introduced by further processing of the lateral position estimates. Embodiments of the invention also provide a technique for operating a servomechanism in a tape drive system consistent with the above.

FIG. 1 is a schematic representation of a tape head and a segment of a linear data storage tape with a plurality of separate servo bands in accordance with embodiments of the invention. FIG. 1 shows a linear data storage tape 100 and a tape head 120. The linear data storage tape 100 has a plurality of separate longitudinal servo bands 140, 141, 142, 143 and 144, laterally positioned on the linear data storage tape. The tape head 120 includes a number of separate read and/or write elements 122 and two separate servo transducers 124 and 125 which are laterally offset (along the y-axis) from the read and/or write elements 122. In use, each of the servo transducers 124, 125 track follows a servo track (or servo path) along one of the servo bands (e.g., band 140 and 141) while the elements 122 read and/or write data with respect to a number of data tracks (not shown) positioned between the servo bands.

Figure 2:
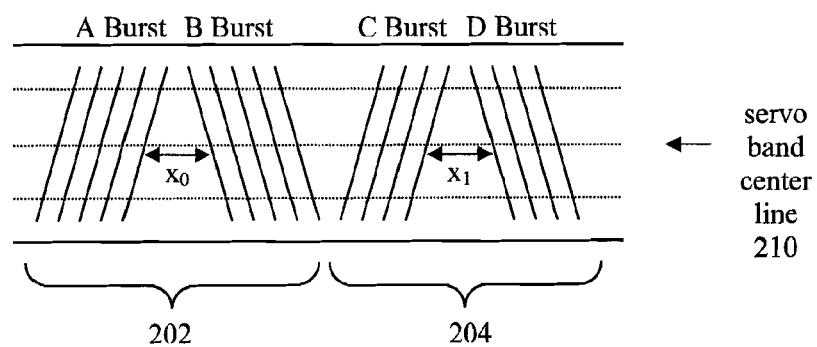
FIG. 2 is an illustration of a servo band in accordance with embodiments of the invention.

FIG. 2 is an illustration of a servo band (e.g., servo band 140) in accordance with embodiments of the invention. In FIG. 2, a servo band center line 210 and two pairs of servo bursts 202 and 204 are shown. "A Burst" and "B Burst" make up the servo burst pair 202. "C Burst" and "D Burst" make up the servo burst pair 204. The servo bursts in one pair are written on tape at an angle relative to each other. For example, A Burst is at an angle relative to B Burst. In application, a servo transducer (e.g., 124) is configured to move longitudinally relative to the tape (e.g., along the x-direction identified in FIG. 1) in a manner so as to keep a constant value for the distance between the bursts (e.g., $x_0$ between A Burst and B Burst, and $x_1$ between C Burst and D Burst). In this way, the servo transducer follows a straight line within the servo band. Any small deviation away from the correct path causes a variation (plus or minus) in the gap between the bursts. This configuration allows for head lateral position and tape velocity estimates to be derived from the relative timing of pulses generated by a servo reader reading the servo bursts. In many applications, two servo bands (e.g., 140 and 141) are used simultaneously to provide two sources of servo information for increased accuracy. In those applications, two servo readers are active at all times to read two dedicated servo channels. Longitudinal tape position as well as lateral head position information may be derived from each servo channel.

In TBS systems, recorded servo patterns have transitions with two different slopes such as shown in FIG. 2. The current TBS format specifies several nominal servo positions parallel to the servo band center line, e.g., 210. The nominal servo positions serve as reference within each servo band for the track-following system. Each generation of LTO drives is characterized by a specific number of nominal servo positions, and hence by a specific number of tracks within a data band. Accordingly, this technology can be very finely tuned and is capable of supporting very high track densities using the same servo tracks because the nominal positions are not fixed servo tracks but instead definitions of different "x distances" (or sets of "x distances") between servo bursts.

Figure 3:
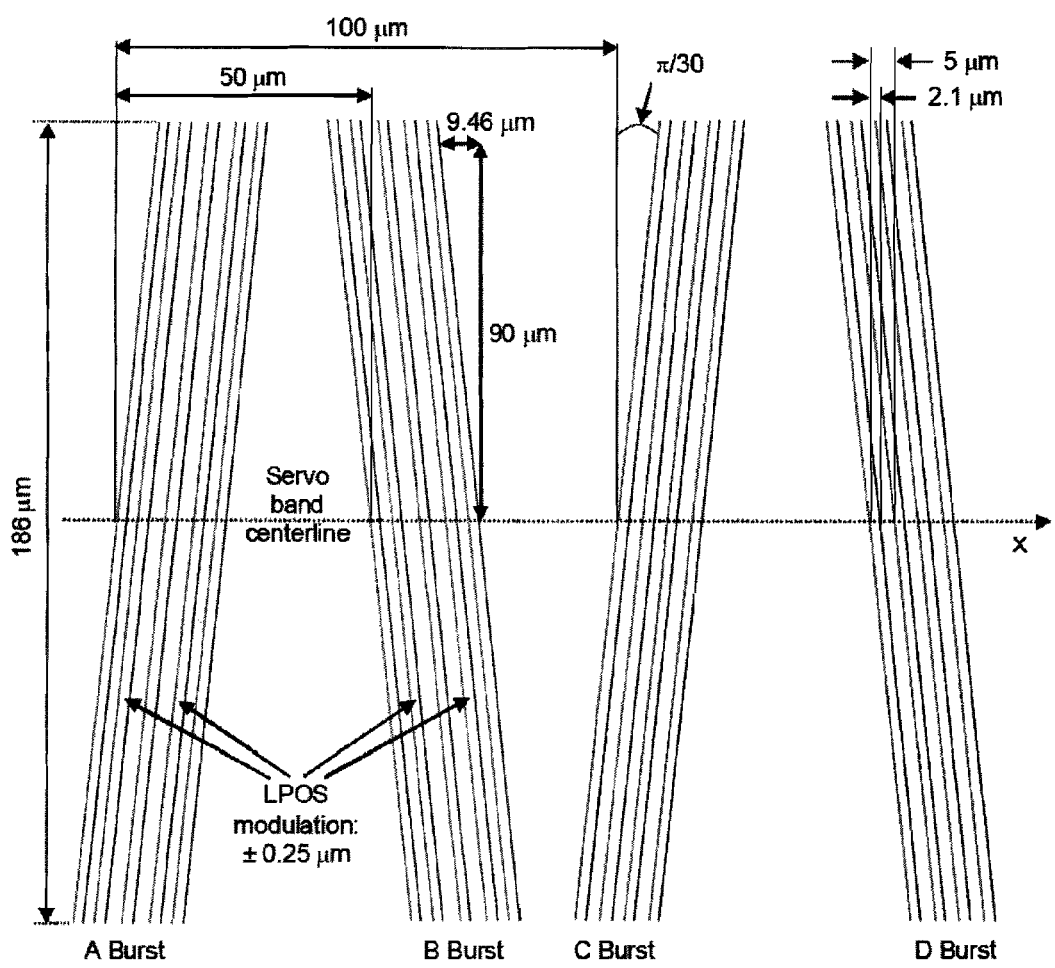
FIG. 3 is an illustration of a pair of servo burst patterns in accordance with embodiments of the invention.

FIG. 3 is an illustration of a pair of servo burst patterns in accordance with embodiments of the invention. Lateral position estimates are generated by a servo channel processing a signal $s(t)$ from a servo reader. In FIG. 3, the rate at which the lateral position estimates are generated is equal to the velocity v of the tape divided by the distance (in this case, 100 μm) between servo burst pairs. The lateral position information is used to determine a position-error-signal (PES), which in tape drive systems is provided as input to a compensator of a track-following servomechanism. In FIG. 3, longitudinal position (LPOS) information was encoded using pulse-position modulation (PPM) techniques. The pulse-position modulation for the encoding of the LPOS information is indicated in the A and B bursts of FIG. 3 as an "LPOS modulation" of +/−0.25 μm.

Figure 4:
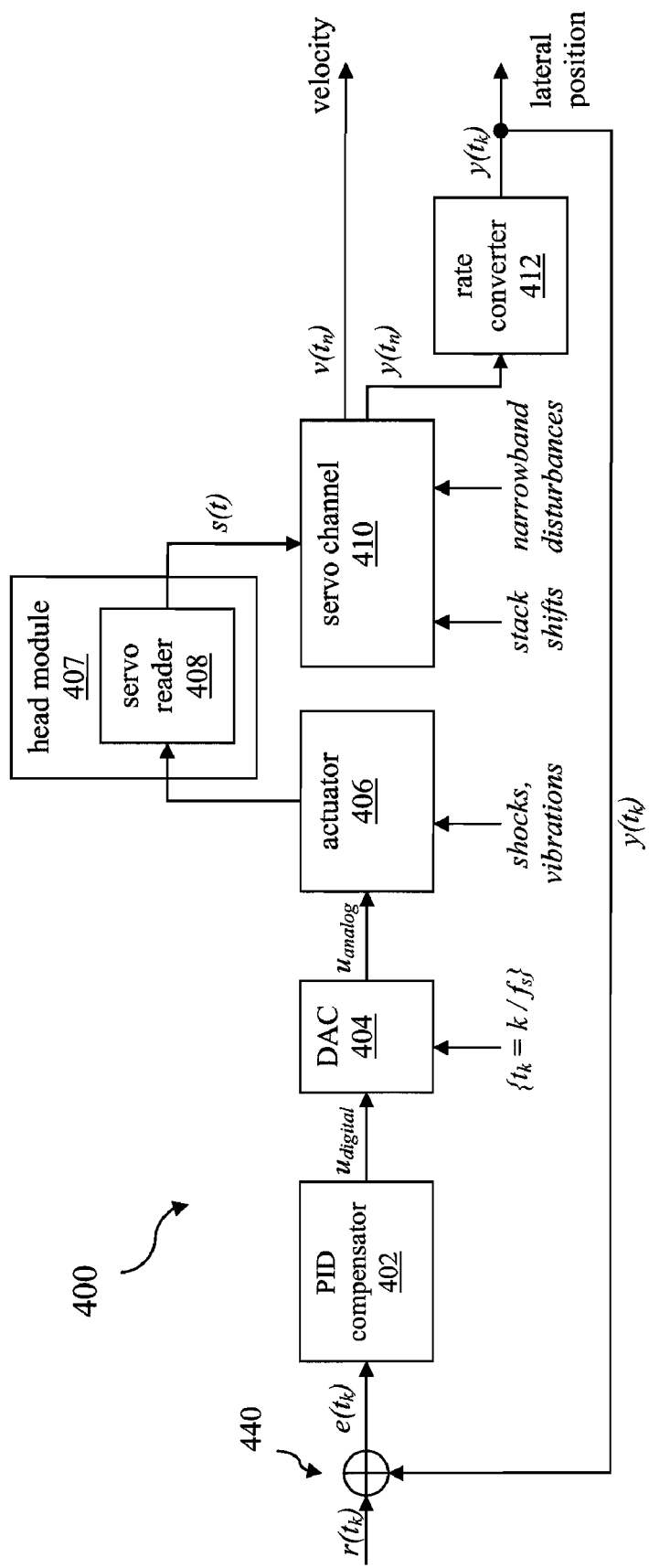
FIG. 4 is a block diagram of a prior art track-following servomechanism for a tape drive system.

FIG. 4 is a block diagram of a prior art track-following servomechanism for a tape drive system. The servomechanism 400 is based on a proportional-integral-derivative (PID) compensator 402 in asynchronous mode of operation. The servomechanism 400 includes the PID compensator 402, a digital-to-analog converter (DAC) 404, an actuator 406, a head module 407, at least one servo reader 408 located in or on the head module 407, a servo channel 410, a rate converter 412, and a subtractor 440. FIG. 4 also shows various disturbances that are often present in tape drive systems (e.g., shocks, vibrations, stack shifts, and narrowband disturbances). FIG. 4 further shows a signal s(t) provided by the servo reader to the servo channel, a tape velocity estimate signal $v(t_n)$, lateral position estimate signals $y(t_n)$ and $y(t_k)$, a time signal $t_k$, a reference signal $r(t_k)$, a position error signal (PES) $e(t_k)$, and control signals $u_{digital}$ and $u_{analog}$.

In use, the servomechanism 400 uses the PES $e(t_k)$ as an input to the PID compensator 402. The compensator 402 outputs a digital control signal $u_{digital}$ to the DAC 404. The DAC 404, operating at a fixed sampling rate $f_s$ in asynchronous mode of operation, converts the digital control signal $u_{digital}$ to an analog signal $u_{analog}$ and outputs the analog signal. The actuator 406 receives the analog control signal $u_{analog}$. Based on the control signal, the actuator adjusts the position of the head module 407, which in turn determines positions of the servo reader 408 and corresponding read/write heads (not shown). The read/write heads are maintained at a desired "on track" position via motion of the actuator and also via feedback provided by the servo reader 408. Specifically, the servo reader 408 provides a signal s(t) to the servo channel 410. The servo channel 410 processes the signal s(t) to generate a lateral position estimate, provided as the signal $y(t_n)$, and a signal $v(t_n)$ indicating an estimate of the velocity of the tape being read/written.

The rate at which the lateral position estimates are generated depends on the velocity of the tape. In the configuration shown in FIG. 4, the rate converter 412 converts the rate at which the lateral position estimates are generated (in this case at instants $t_n$) to the fixed sampling rate $f_s$ of the DAC (that is to instants $t_k$). The conversion is performed prior to using the lateral position estimates and the reference signal $r(t_k)$ to determine the PES $e(t_k)$, and prior to providing the PES to the PID compensator. Thus, the servomechanism 400 is considered to be in an asynchronous mode of operation. In a synchronous mode of operation, the rate at which the lateral position estimates are generated is equal to the DAC sampling rate $f_s$, and no rate conversion is performed.

In TBS systems (including the one shown in FIG. 4), the servo channel (e.g., 410) introduces a time-varying delay, specifically a tape velocity-dependent delay, into the estimation of the lateral position. A delay in the feedback of a closed-loop system, e.g. the system shown in FIG. 4, translates into a reduced phase margin, and hence into a higher sensitivity to both process noise and measurement errors. The tape velocity-dependent delay is non-negligible on the performance of the track-following servomechanism at tape velocities below approximately 2 m/s. Currently, tape velocities of possibly 1.6 m/s for read/write operations in commercial tape drives are being considered, with tape velocities of 1 m/s and lower possibly being eventually supported.

One technique of compensating for a time delay is through use of a Smith predictor. In such a technique, the delayed output is predicted using a plant model and a delay time model. Then, by using the predictive output, the time delay can be reduced in a closed-loop configuration. The use of a Smith predictor can be extended to state space, where it may be referred to as state predictive control. However, when the time delay cannot be reliably estimated (e.g., due to variable velocities or model inaccuracies), a significant error arises between the delay time model in the Smith predictor and the actual delay time. This leads to impaired loop stability and performance.

Embodiments of the invention provide a method and system for mitigating effects of a feedback delay that is dependent on an observable system parameter. Embodiments of the invention incorporate an adjustable predictor (e.g., a Kalman filter) to mitigate the effects of the time-varying delay introduced by the servo channel in tape drive systems. Parameters of the predictor can be adjusted to optimize for certain conditions, including for example, operation of the tape drive system at tape velocities of less than 2.0 m/s, e.g., in the range of 0.6-1.6 m/s, in the range of 0.4-1.4 m/s, in the range of 0.8-1.2 m/s, or a range of 1.0-1.8 m/s.

Figure 5:
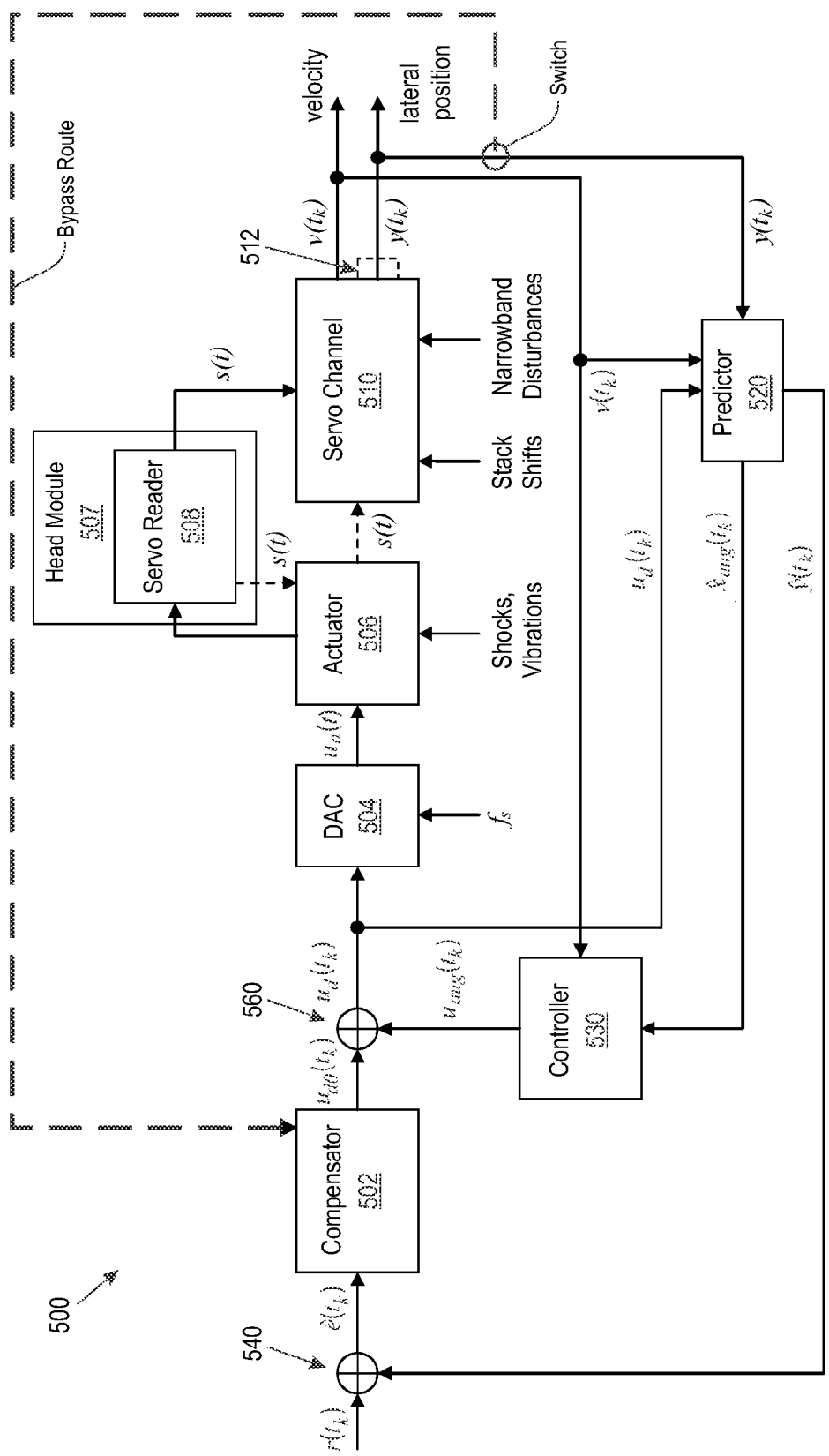
FIG. 5 is a block diagram of a track-following servomechanism for a tape drive system in a synchronous mode of operation in accordance with embodiments of the invention.

FIG. 5 is a block diagram of a track-following servomechanism 500 for a tape drive system in a synchronous mode of operation in accordance with embodiments of the invention. In FIG. 5 discrete-time operation of the track-following loop is assumed, where estimates $v(t_k)$ and $y(t_k)$ are computed at time instants $t_k$=k 100 μm/v. The track-following servomechanism 500 mitigates effects of a delay in a lateral position estimate introduced by a servo channel. The delay is dependent on tape velocity. Accordingly, the delay is, and/or during simulation is modeled as, a function of the tape velocity and expressed herein as τ(v).

The servomechanism 500 includes a compensator 502, a digital-to-analog converter (DAC) 504, an actuator 506, a head module 507, at least one servo reader 508 located in or on the head module 507, a servo channel 510, a predictor 520, a controller 530, a subtractor 540, and an adder 560. FIG. 5 also shows various disturbances often present in tape drive systems (e.g., shocks, vibrations, stack shifts, and narrowband disturbances). FIG. 5 further shows a signal s(t) provided by the servo reader 508 to the servo channel 510, a tape velocity estimate signal $v(t_k)$, lateral position estimate signals $y(t_k)$ and $\hat{y}(t_k)$, a state signal $\hat{x}_{aug}(t_k)$, a reference signal $r(t_k)$, a position error signal (PES) $\hat{e}(t_k)$, and control signals $u_{a0}(t_k)$, $u_{aug}(t_k)$, $u_d(t_k)$, and $u_a(t)$.

In FIG. 5, the DAC 504 operates at a sampling rate of $f_s$ and is configured to receive a digital control signal $u_d(t_k)$, convert the digital control signal $u_d(t_k)$ to an analog control signal $u_a(t)$, and output the analog control signal $u_a(t)$. The actuator 506 is coupled to the DAC 504 and also coupled to the head module 507. The head module 507 houses (provides physically support for) at least one servo reader (e.g., 508). The actuator 506 is configured to receive from the DAC 504 the analog control signal $u_a(t)$ and actuate motion of the head module 507, and therefore the servo reader 508, based on the analog control signal $u_a(t)$. In one embodiment, the actuator 506 is configured to receive from the servo reader 508 a servo signal s(t), as shown in FIG. 5 by the dashed arrows.

The servo channel 510 is coupled to the servo reader 508. The servo channel 510 is configured to receive the servo signal s(t) and output a lateral position estimate signal $y(t_k)$ and a tape velocity estimate signal $v(t_k)$. The lateral position estimate signal $y(t_k)$ represents a lateral position estimate of the servo reader 508 and accordingly may also be used to represent a lateral position estimate of the head module 507. The tape velocity estimate signal $v(t_k)$ represents a longitudinal velocity (e.g., 0.6 m/s-⅙ m/s) of a tape (e.g., 100). The servo channel 510 introduces a tape velocity-dependent delay $\tau(v)$ into the lateral position estimate signal $y(t_k)$. In certain embodiments, the servo channel 510 is equivalent to (and/or during simulation is modeled as) a first-order low-pass filter having a variable time constant given by the delay $\tau(v)$. In one embodiment, this variable time constant varies based on the delay $\tau(v)$.

The predictor 520 is coupled to the servo channel 510. In one embodiment, the predictor 520 is a Kalman filter (sometimes referred to as a Kalman predictor). The predictor 520 is configured to receive from the servo channel 510 the lateral position estimate signal $y(t_k)$ and the tape velocity estimate signal $v(t_k)$. The predictor 520 is also configured to receive from the adder 560 a digital control signal $u_d(t_k)$. The predictor 520 is further configured to output an estimate of an augmented actuator state signal $\hat{x}_{aug}(t_k)$ (as described further below), and a modified lateral position estimate signal $\hat{y}(t_k)$.

The controller 530 is coupled to the servo channel 510 and the predictor 520. In one embodiment, the controller is a linear quadratic Gaussian (LQG) controller. The controller 530 is configured to receive from the servo channel 510 the tape velocity estimate signal $v(t_k)$. The controller 530 is also configured to receive from the predictor 520 the estimate of the augmented actuator state signal $\hat{x}_{aug}(t_k)$. The controller 530 is configured to output an augmented control signal $u_{aug}(t_k)$, which is received by the adder 560.

The subtractor 540 is coupled to the predictor 520 and configured to receive from the predictor 520 the modified lateral position estimate signal $\hat{y}(t_k)$. The subtractor 540 is also configured to output the difference between a reference signal $r(t_k)$ and the modified lateral position estimate signal $\hat{y}(t_k)$. The subtractor 540 outputs this difference as a modified position error signal $\hat{e}(t_k)$.

The compensator 502 is coupled to the subtractor 540. In one embodiment, the compensator is a proportional-integral-derivative (PID) compensator. The compensator 502 is configured to receive from the subtractor 540 the modified position error signal $\hat{e}(t_k)$. The compensator 502 outputs a preliminary digital control signal $u_{d0}(t_k)$.

The adder 560 is coupled to the compensator 502, the controller 530, the DAC 504, and the predictor 520. The adder 560 is configured to receive from the compensator 502 the preliminary digital control signal $u_{d0}(t_k)$. The adder 560 is also configured to receive from the controller 530 the augmented control signal $u_{aug}(t_k)$. The adder is configured to output to the DAC 504 and to the predictor 520 the digital control signal $u_d(t_k)$.

In use, the servo signal $s(t)$ is received from the servo reader 508. Based on the servo signal $s(t)$, a lateral position estimate signal $y(t_k)$ of the servo reader is determined (e.g., by servo channel 510). Also based on the servo signal $s(t)$, the estimated velocity signal $v(t_k)$ of the tape (e.g., 100), which represents a longitudinal velocity of the tape, is determined (e.g., by the servo channel 510). The estimated velocity signal $v(t_k)$ and the lateral position estimate signal $y(t_k)$ are transmitted to the predictor 520. The predictor determines a modified lateral position estimate signal $\hat{y}(t_k)$ that reduces or minimizes the difference, introduced by the tape velocity-dependent delay $\tau(v)$, between the modified lateral position estimate signal $\hat{y}(t_k)$ and an actual lateral position. The modified lateral position estimate signal $\hat{y}(t_k)$ is then provided to the compensator 502, in FIG. 5 by way of the subtractor 540. In FIG. 5, the modified lateral position estimate signal $\hat{y}(t_k)$ is provided to the compensator 502 after being adjusted based on a reference signal $r(t_k)$. The subtractor 540 performs the adjustment and provides the adjusted signal as the error signal $\hat{e}(t_k)$ to the compensator 502. The compensator 502 uses the modified error signal $\hat{e}(t_k)$, which is based on the modified lateral position estimate signal $\hat{y}(t_k)$, to adjust its output signal (e.g., $u_{d0}(t_k)$) such that the control signals (e.g., $u_d(t_k)$ and $u_a(t)$), upon which the motion of the actuator and therefore the head module is based, are modified. Accordingly, based on the error signal, the compensator 502 outputs a control signal to the actuator 506 (e.g., via the adder 560 and the DAC 504).

In the embodiment shown in FIG. 5, the mechanical behavior of the actuator may be approximated by a simple spring-damper-mass model. Accordingly, the actuator can be represented by the second-order differential equation:

$$m\ddot{x}(t)+b\dot{x}(t)+kx(t)=\text{externally applied force}+\text{disturbances} =gu(t)+d(t) \quad (1)$$

wherein $x(t)$ represents the position of the actuator, the first derivative $\dot{x}(t)$ of the position indicates the actuator's velocity, the second derivative $\ddot{x}(t)$ of the position indicates the actuator's acceleration, m represents the mass of the actuator, b represents a damping coefficient, and k represents a spring constant. The externally applied force is represented by the product of a transducer gain g and the control signal $u(t)$. The disturbances, due to shocks and vibrations for example, are represented by $d(t)$. By defining the state vector of the actuator as $$x(t) = \begin{bmatrix} x(t) \\ \dot{x}(t) \end{bmatrix} = \begin{bmatrix} \text{position} \\ \text{velocity} \end{bmatrix}, \quad (2)$$

the differential equation (1) representing the actuator may be expressed in state-space form as $$\dot{x}(t) = \begin{bmatrix} 0 & 1 \\ -k/m & -b/m \end{bmatrix} x(t) + \begin{bmatrix} 0 \\ g/m \end{bmatrix} u(t) + \begin{bmatrix} 0 \\ 1/m \end{bmatrix} d(t). \quad (3)$$

When the servo channel is equivalent to (or can be substantially treated as) a first-order low-pass filter having a variable time constant that varies based on the delay $\tau(v)$, the dynamics of an augmented system (approximating the combined actuator and servo channel) are described by $$\dot{x}_{aug}(t) = \begin{bmatrix} 0 & 1 & 0 \\ -k/m & -b/m & 0 \\ 1/\tau(v) & 0 & 1/\tau(v) \end{bmatrix} x_{aug}(t) + \begin{bmatrix} 0 \\ g/m \\ 0 \end{bmatrix} u(t) + \begin{bmatrix} 0 \\ 1/m \\ 0 \end{bmatrix} d(t), \quad (4)$$

where the state vector of this augmented system is defined as $$x_{aug}(t) = \begin{bmatrix} x(t) \\ x_{lpf}(t) \end{bmatrix} = \begin{bmatrix} \text{actuator state} \\ \text{low-pass filter state} \end{bmatrix}. \quad (5)$$

The output signal of the augmented system (i.e., the combined actuator and servo channel) is given by the lateral position estimates outputted by the servo channel. This output can be expressed in terms of a state vector as $$y(t)=[0 0 1]x_{aug}(t)+w(t), \quad (6)$$

where w(t) represents the measurement error due to, for example, stack shifts, narrowband disturbances representing lateral tape motion, and additive stationary and nonstationary noise affecting the servo channel signal. The predictor (e.g., a Kalman filter) mitigates effects of the tape velocity dependent delay on the system by estimating the state of the augmented system given by the cascade of such a second-order actuator and such a first-order servo channel.

Figure 6:
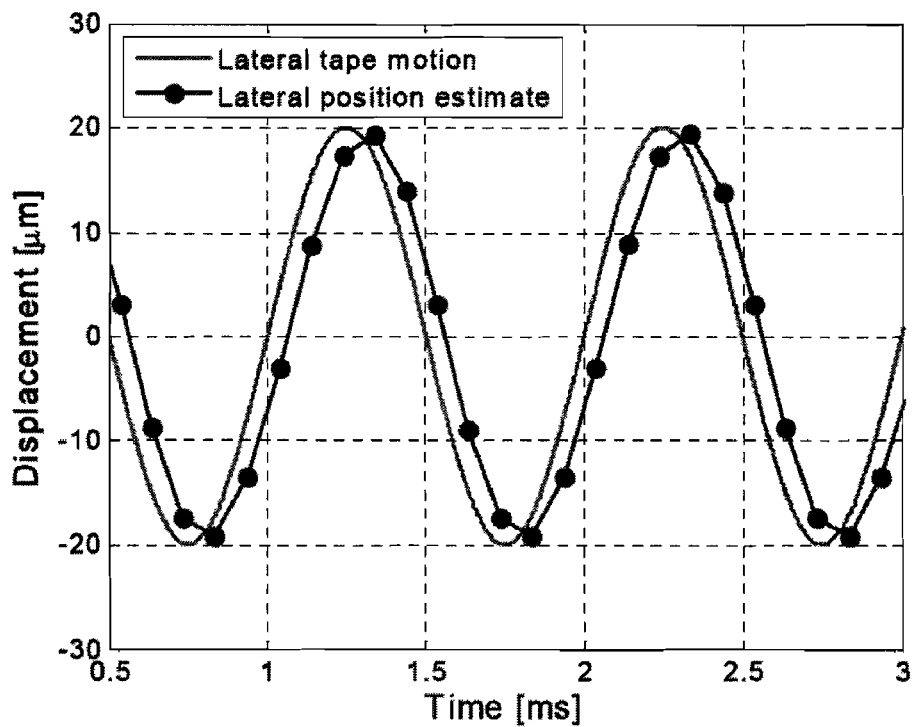
FIG. 6 is a graph illustrating a servo channel delay for a tape velocity of 1 m/s and a sinusoidal tape motion disturbance of 20 μm in amplitude and 1 kHz in frequency.

The velocity-dependent delay τ(v) may be better understood by considering a disturbance in tape motion. One type of disturbance is sinusoidal lateral tape motion. FIG. 6 is a graph illustrating a servo channel delay for a tape velocity of 1 m/s and a sinusoidal tape motion disturbance of 20 μm in amplitude and 1 kHz in frequency. In the case of sinusoidal lateral tape motion disturbances with a slew rate of up to 0.1 m/s and an amplitude within the range of the actuator stroke, the servo channel delay is essentially independent of the disturbance amplitude and frequency in the frequency band where the servo channel operates (which is in the order of a few kHz).

Figure 7:
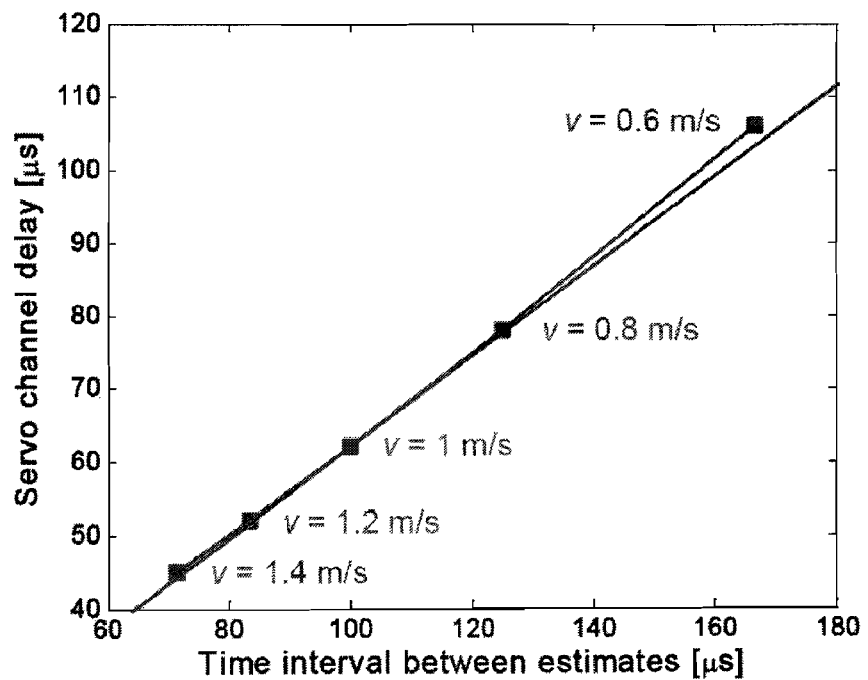
FIG. 7 is a graph of servo channel delay versus time interval between lateral position estimates in accordance with embodiments of the invention.

FIG. 7 is a graph of servo channel delay versus time interval between lateral position estimates in accordance with embodiments of the invention. In FIG. 7, the abscissa is given by the time interval between consecutive lateral position estimates. For tape velocities in the range where the servo channel delay is non-negligible and read/write operations for future LTO drive generations are envisioned (e.g., approximately 0.6 m/s-1.6 m/s), the delay is approximately inversely proportional to velocity. For servo patterns such as in FIG. 3, the dependency of the delay (expressed in milliseconds) on velocity (expressed in m/s) can be represented by the approximation $$\tau(v) = \frac{c}{v} \approx \frac{62}{v}, \quad (7)$$

where c is a constant of proportionality obtained, in the case above, by observing the servo channel delay for a tape velocity of 1 m/s (which is between 0.6 m/s and 1.6 m/s). When the tape velocity is 1 m/s, the constant of proportionality c is 62, as understood by examining FIG. 7.

In certain embodiments, the predictor is configured to determine the estimate of the augmented actuator state signal $\hat{x}_{aug}(t)$ and the modified lateral position estimate signal ŷ(t) at discrete time instants such that the modified lateral position estimate signal can be expressed as $\hat{y}(t_k)$. In synchronous mode of operation, the discrete time instants $t_k$ are equal to an integer k times a sampling interval T of the DAC, where $T=1/f_s$. In FIG. 5, the sampling rate $f_s$ of the DAC 504 is synchronous with the rate at which the servo channel generates the lateral position estimates. Thus, when reading/writing to a tape having servo patterns such as those shown in FIG. 3, the rate of generation of the lateral position estimates is given by $$\text{rate of lateral position estimates generation} = \frac{\text{velocity of tape}}{100 \, \mu m} \quad (8)$$

Accordingly, the sampling interval T of the DAC 504 would be $$T = \frac{1}{f_s} = \frac{100 \, \mu m}{\text{velocity of tape}} \quad (9)$$

since the servomechanism is in synchronous mode of operation (i.e., the rate at which the lateral position estimates are generated is equal to the DAC sampling rate $f_s$, and no rate conversion is performed.) In another embodiment, the servomechanism is in an asynchronous mode of operation. In such an embodiment, a rate converter (e.g., 512) may be positioned to receive the lateral position estimates from the servo channel (e.g., $y(t_n)$) and convert the rate at which the lateral position estimates are generated to the fixed sampling rate $f_s$ of the DAC, outputting $y(t_k)$.

For each tape velocity in a set of target velocities, the state-space realization of the track-following servomechanism may be obtained by an optimization procedure that reduces or minimizes the contribution of process noise and measurement noise to the output lateral position. In applications where the standard deviations of both process noise and measurement noise are known for the target velocities, this procedure may include the following operations.

First, for a given velocity at which the servo channel delay is negligible (e.g., >2.0 m/s), parameters of the compensator (e.g., a PID compensator) are identified which minimize the sum of weighted norms. The weighted norms characterize the deviation of the overall closed-loop response from a desired transfer characteristic, as well as the contributions of process and measurement noise to the output y-position (e.g., $\hat{y}(t_k)$).

Then, while maintaining the compensator parameters identified, parameters for the predictor (e.g., a Kalman filter) and the controller (e.g., the LQG controller) are identified at each of the target velocities within the set (e.g., a predetermined set of velocities within the range of 0.6 m/s-1.6 m/s or other ranges). In certain embodiments, these parameters are identified based on equation (4) which represents the dynamics of the augmented system, and equation (6) which represents the output signal of the augmented system in terms of a state vector.

Figure 8:
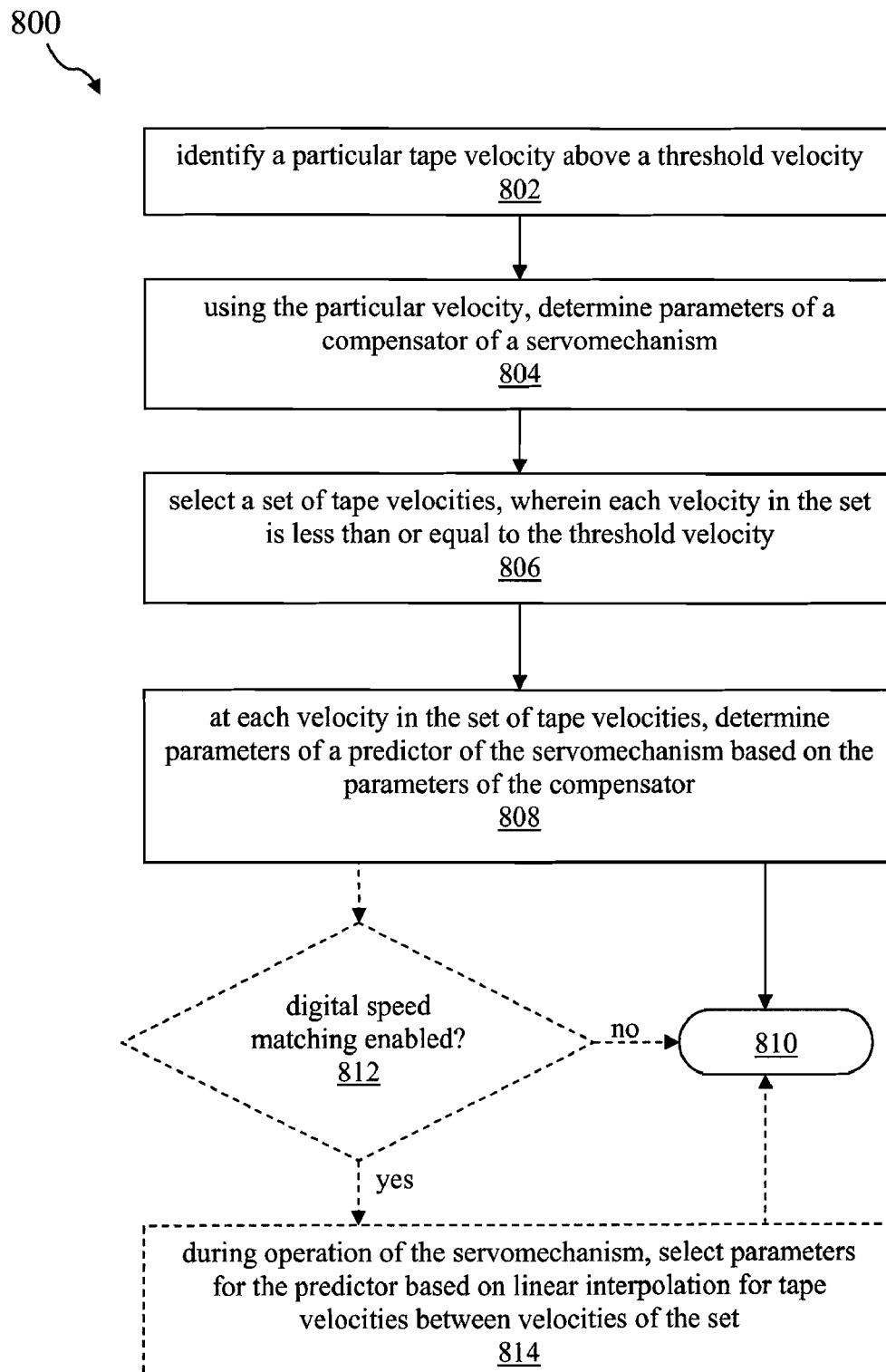
FIG. 8 is a diagram of a method for determining parameters of a predictor filter of a track-following servomechanism in accordance with embodiments of the invention.

FIG. 8 is a diagram of a method 800 for determining parameters of a predictor filter of a track-following servomechanism in accordance with embodiments of the invention. At operation 802, a particular tape velocity above a threshold velocity (e.g., 1.6 m/s) is identified. At operation 804, using the particular velocity, parameters of a compensator (e.g., a PID compensator of a track-following servomechanism) are determined. At operation 806, a set of tape velocities is selected. Each velocity in the set is less than or equal to the threshold velocity. For example, if the threshold velocity is 1.6 m/s, the set of tape velocities may be {0.6 m/s; 0.8 m/s; 1.0 m/s; 1.2 m/s; 1.4 m/s}. At operation 808, parameters of a predictor of the servomechanism are determined at each velocity in the set of tape velocities based on the parameters of the compensator. At operation 810, the method ends. In use, the operations 802-810 may be applied as an optimization technique.

In certain applications, a gain scheduling approach is adopted to determine coefficients of the predictor in case of drive operations where variable tape velocities occur, such as when the predictor is part of a servomechanism in a tape drive system having digital speed matching. Digital speed matching adjusts throughput under slow or varying host data transfer rate conditions. Digital speed matching is intended to mitigate performance inconsistency problems in systems in which the tape drive delivers throughput that is sufficiently high such that other system components (e.g., the operating system, host adapters, servers, and disk subsystems) have difficulty keeping up with the streaming performance capabilities. Digital speed matching reduces the number of repositions and improves throughput performance. Since in certain embodiments the servo channel provides nearly instantaneous estimates of tape velocity, linear interpolation can be used to obtain parameters (e.g., coefficients) of the predictor and controller fairly accurately. Accordingly, in applications in which digital speed matching is enabled, parameters of the Kalman filter and of the controller may be considered to vary linearly between the parameter values obtained for the finite set of tape velocities (e.g., at operation 808).

Accordingly, in one embodiment, the method 800 may further include operation 812, at which it is determined if the servomechanism is in a tape drive system having digital speed matching enabled. This may be accomplished statically or dynamically at run-time by reading or otherwise checking a flag or a jumper for example. Then, at operation 814, during operation of the servomechanism, for tape velocities between velocities of the set, parameters are selected for the predictor based on linear interpolation. In certain embodiments, parameters are also selected for the controller based on linear interpolation, e.g., also at operation 814.

Figure 9:
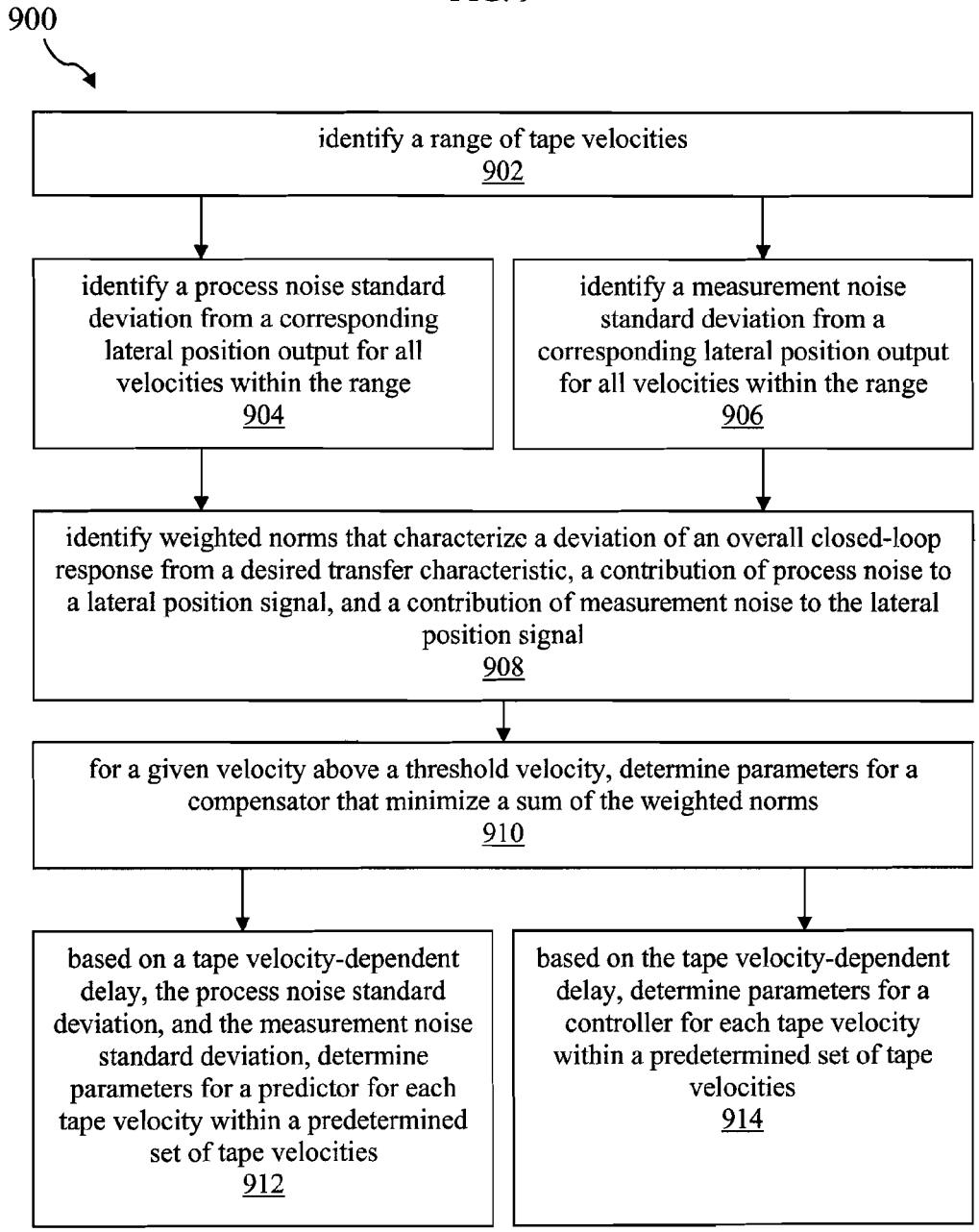
FIG. 9 is a diagram of a method for determining parameters of a track-following servomechanism in accordance with embodiments of the invention.

FIG. 9 is a diagram of a method 900 for determining parameters of a track-following servomechanism in accordance with embodiments of the invention. At operation 902, a range of tape velocities is identified. At operation 904, a standard deviation due to process noise from a corresponding lateral position output is identified for all velocities within the range. At operation 906, a standard deviation due to measurement noise from a corresponding lateral position output is identified for all velocities within the range. At operation 908, weighted norms that characterize a deviation of an overall closed-loop response from a desired transfer characteristic, a contribution of process noise to a lateral position signal, and a contribution of measurement noise to the lateral position signal are identified. At operation 910, for a given velocity above a threshold velocity (e.g., 1.6 m/s), parameters for a compensator that minimize a sum of the weighted norms are determined. At operation 912, parameters for a predictor for each tape velocity within a predetermined set of tape velocities are determined based on a tape velocity-dependent delay $\tau(v)$, the process noise standard deviation, and the measurement noise standard deviation. At operation 914, parameters for a controller for each tape velocity within a predetermined set of tape velocities are determined based on the tape velocity-dependent delay $\tau(v)$. In one embodiment, the compensator is a proportional-integral-derivative (PID) compensator, the predictor is a Kalman filter, and the controller is a linear quadratic Gaussian (LQG) controller. In one embodiment, the threshold velocity is above 1.6 m/s and each tape velocity within the predetermined set of tape velocities is between 0.6 m/s-1.6 m/s, inclusive.

By using a Kalman filter as the predictor filter, a combined plant and ideal servo channel with constant delay can be approximated. For a given tape velocity v, steady-state equations for a Kalman filter may be expressed as $$\hat{x}_{aug,k} = \bar{x}_{aug,k} + L(y(t) - H\bar{x}_{aug,k}) \text{(measurement update)} \quad (10)$$

and $$\bar{x}_{aug,k+1} = F\bar{x}_{aug,k} + Gu_k, \text{(time update)} \quad (11)$$

wherein y(t) is the lateral position estimate signal from the servo channel at discrete time instants k, L is a 3×1 matrix that represents an innovation gain of the Kalman filter, F is a 3×3 matrix, G is a 3×1 matrix, and H is a 1×3 matrix, and wherein the matrices F, G, and H give a discrete-time state-space representation of the servomechanism. In certain embodiments, L depends on $\tau, \sigma_d^2, \sigma_w^2$, and v, wherein $\tau$ is the delay, $\sigma_d$ is variance of process noise, and $\sigma_w$ is variance of measurement noise, and therefore may be expressed as $L(\tau, \sigma_d^2, \sigma_2^2; v)$. The tape velocity v is also indicated as a variable since, in general, the servo channel delay, the process noise variance, and the measurement noise variance all depend on tape velocity. Accordingly, in one embodiment, the Kalman filter is configured to determine an estimate of the augmented actuator state signal $\hat{x}_{aug}(t)$ using equations (10) and (11). The Kalman filter also may be configured to provide a refinement of the lateral position estimate, given by:

$$\hat{y}(t_k) = H\hat{x}_{aug}(t_k) \quad (12)$$

Figure 10:
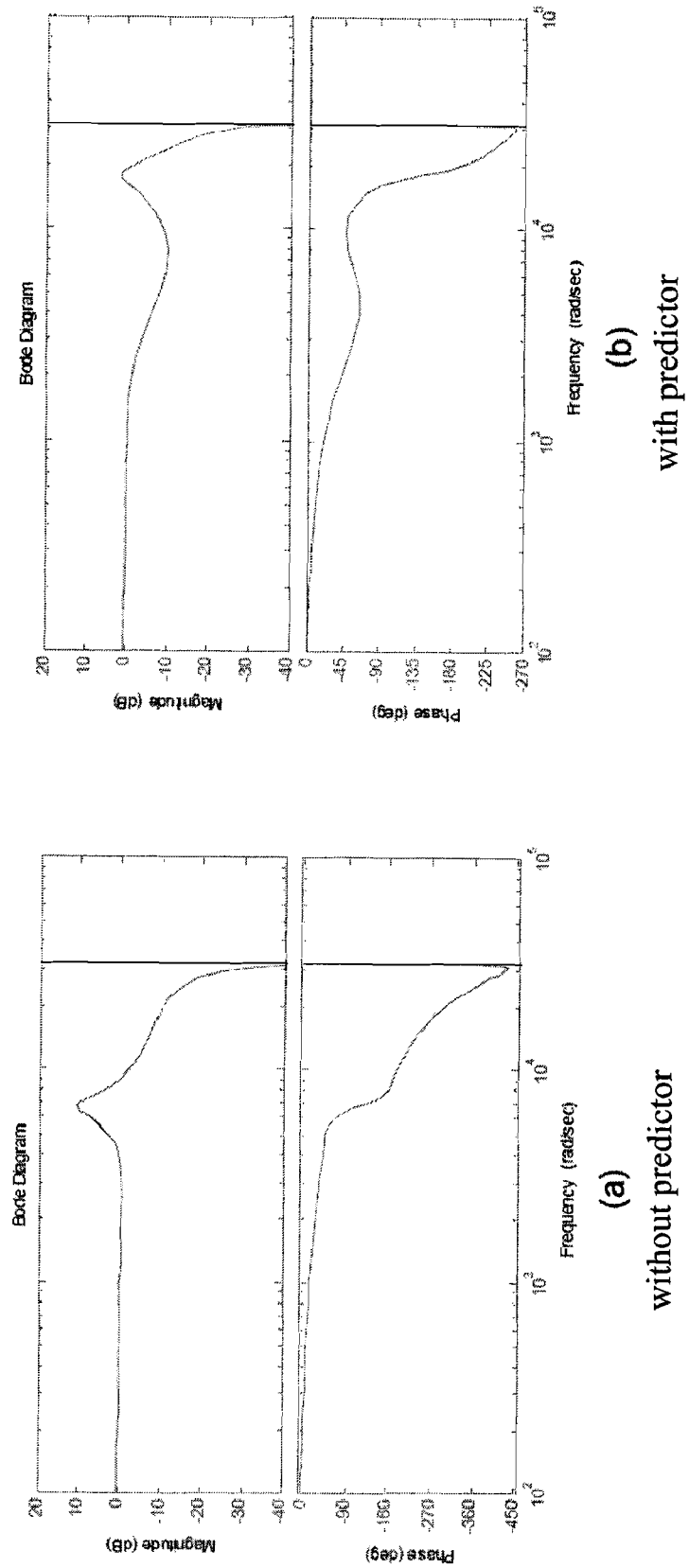
FIGS. 10-12 are diagrams comparing the responses of a prior-art track-following servomechanism to a track-following servomechanism having an adjustable predictor in accordance to embodiments of the invention.
Figure 11:
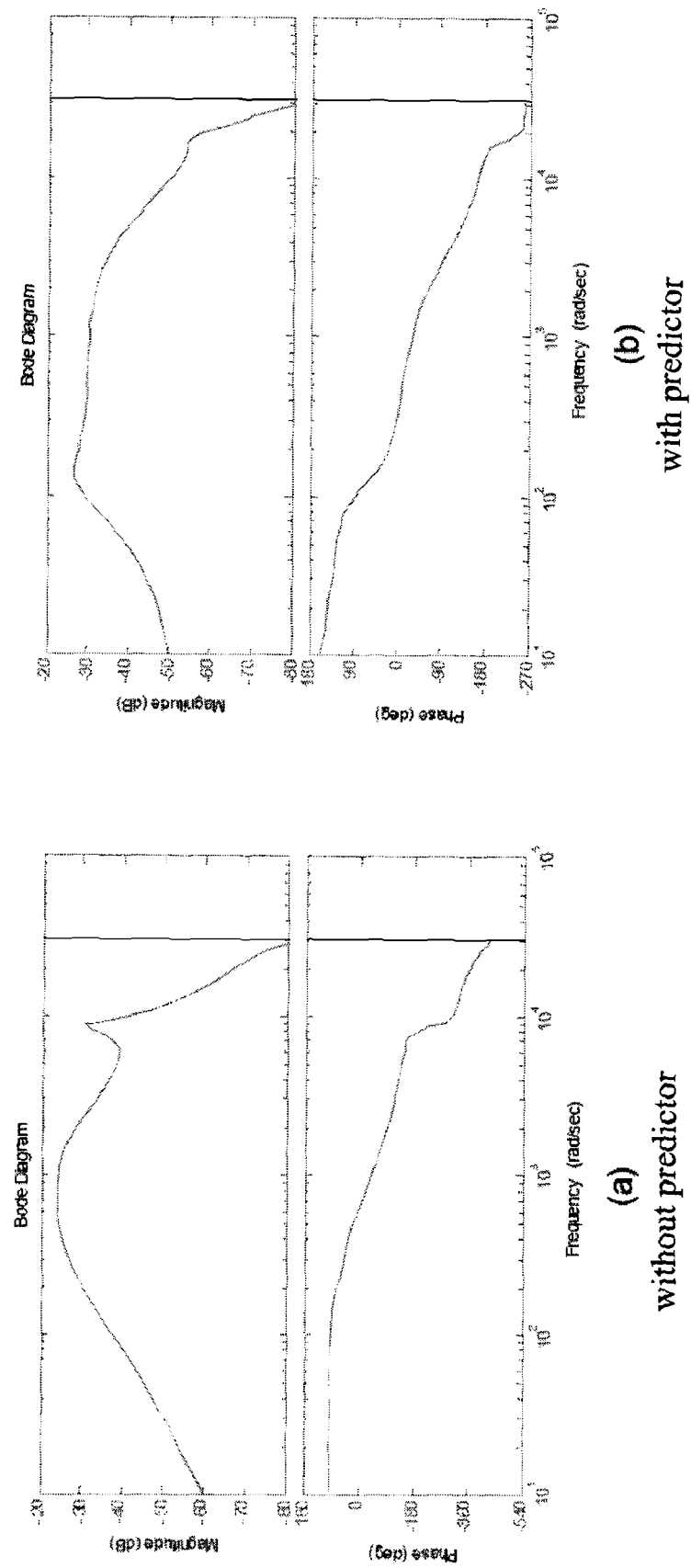
Figure 12:
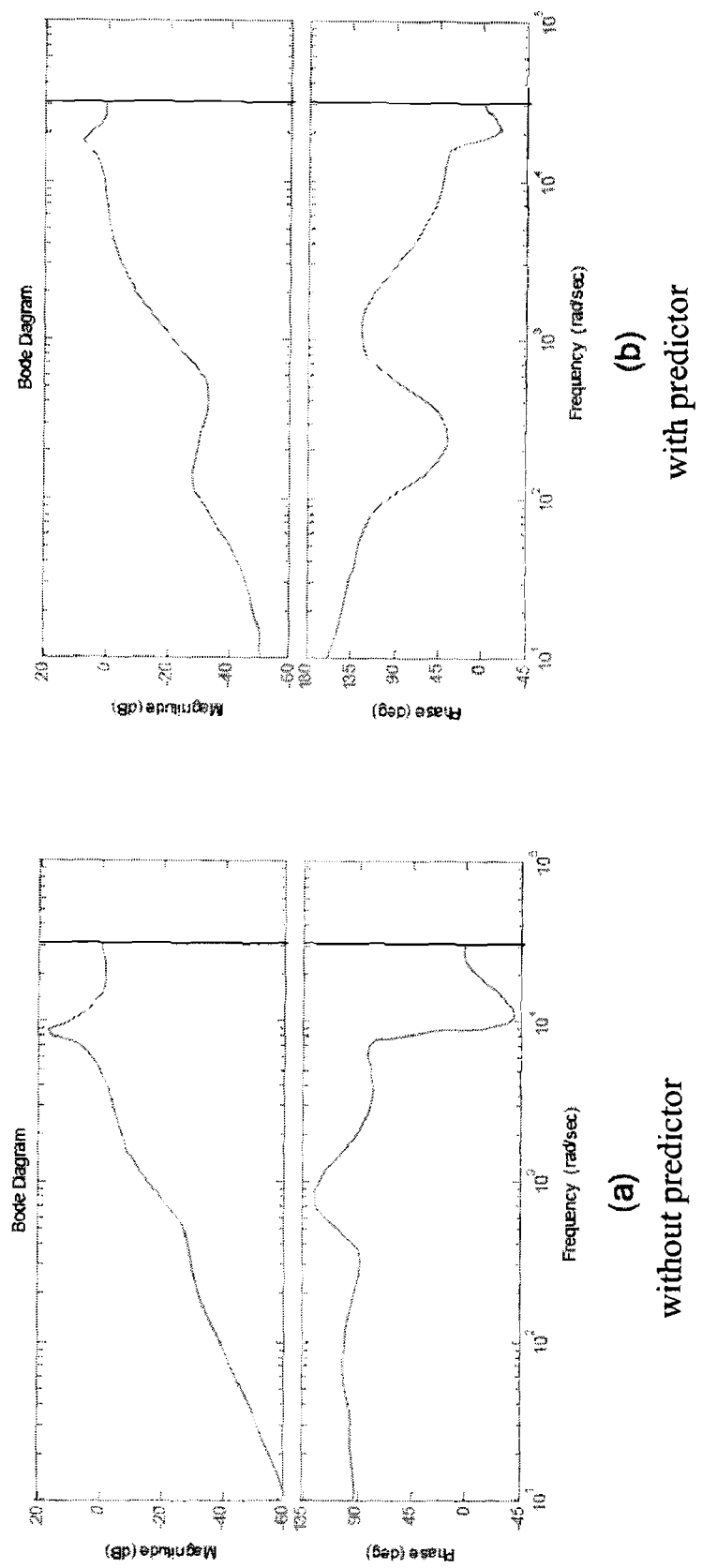

FIGS. 10-12 are diagrams comparing the loop frequency, process noise frequency, and measurement-noise frequency responses of a prior-art track-following servomechanism (as shown in FIG. 4 for asynchronous mode of operation) to a track-following servomechanism having an adjustable predictor in accordance to embodiments of the invention. Specifically, FIG. 10(*a*) shows overall track-following loop frequency response without a predictor (as in FIG. 4) for v=1 m/s. FIG. 10(*b*) shows overall track-following loop frequency response with a predictor in accordance with embodiments of the invention for v=1 m/s. FIG. 11(*a*) shows process noise frequency response without a predictor for v=1 m/s. FIG. 11(*b*) shows process noise frequency response with a predictor for v=1 m/s. FIG. 12(*a*) shows measurement-noise frequency response without a predictor for v=1 m/s. FIG. 12(*b*) shows measurement-noise frequency response with a predictor for v=1 m/s.

Figure 13:
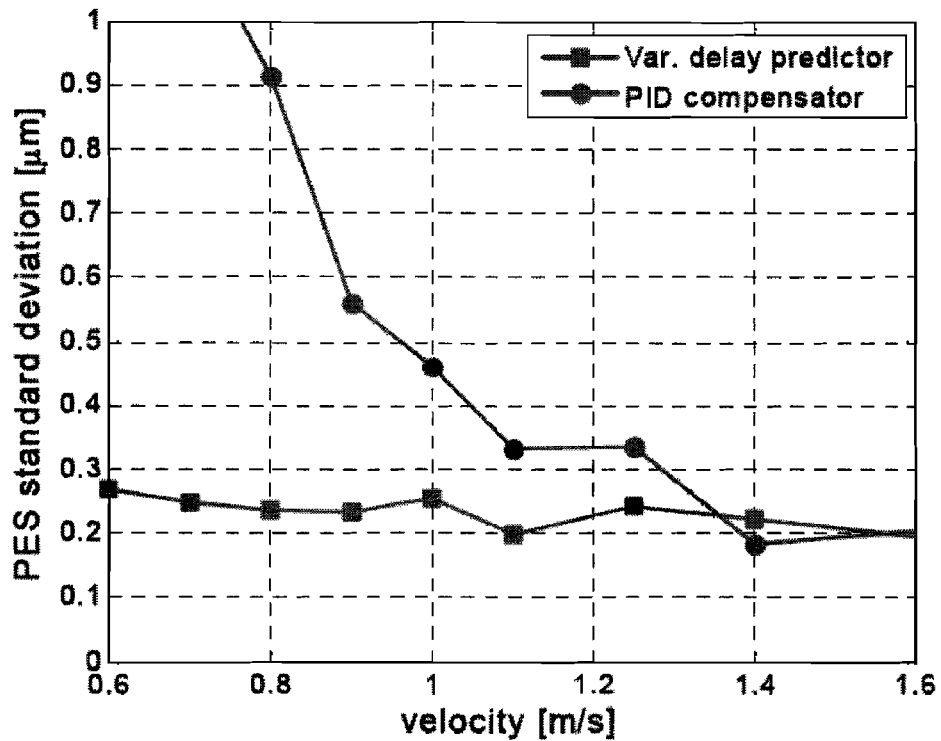
FIGS. 13-14 are diagrams comparing the performance of a prior-art track-following servomechanism to a track-following servomechanism having an adjustable predictor in accordance to embodiments of the invention.
Figure 14:
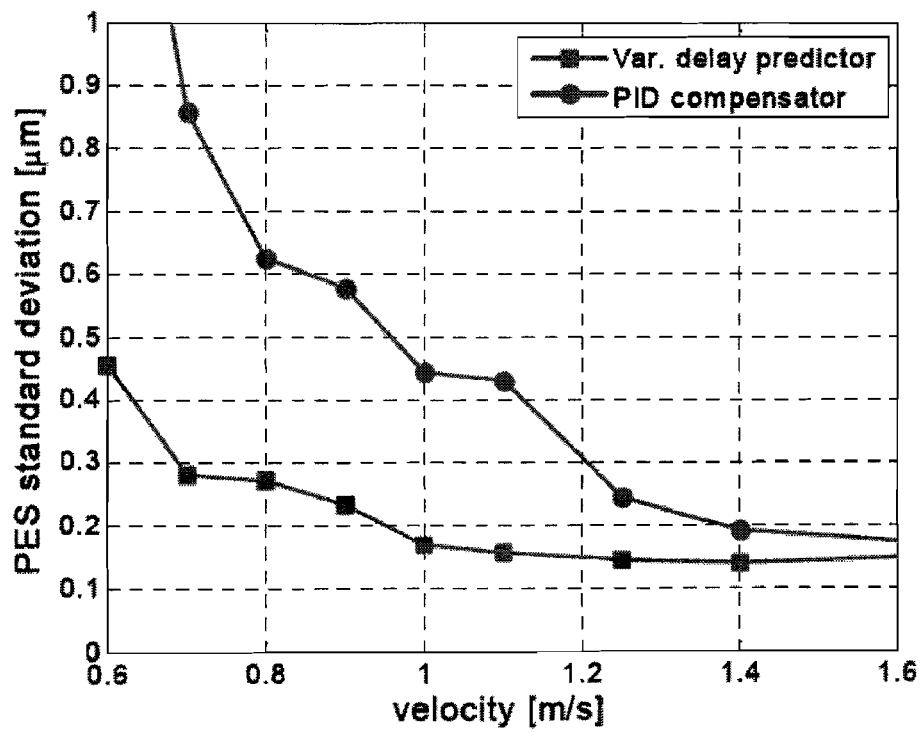

Performance comparisons for entire track-following servomechanisms were made for tape velocities in the range of 0.6-1.6 m/s, inclusive, including actuators and compensators currently implemented in LTO-4 drives. FIGS. 13-14 are diagrams comparing the performance of a prior-art track-following servomechanism (as shown in FIG. 4 for asynchronous mode of operation) to a track-following servomechanism having an adjustable predictor in accordance to embodiments of the invention (such as shown in FIG. 5 for synchronous mode of operation).

FIG. 13 shows a comparison of the performance of an asynchronous track-following servomechanism without and with a predictor. As seen in FIG. 13, the servomechanism with the predictor in accordance with embodiments of the invention has a relatively stable position error signal (PES) standard deviation compared to a servomechanism without the predictor. The PES standard deviation for the servomechanism without the predictor increases approximately exponentially as the velocity decreases below 1.6 m/s.

FIG. 14 shows a comparison of the performance of a synchronous track-following servomechanism without and with a predictor. As seen in FIG. 14, at lower tape velocities (e.g., $\leq$1.6 m/s), the track-following servomechanism with a predictor has a smaller PES standard deviation than the track-following servomechanism without a predictor.

In certain embodiments, the servomechanism is configured to operate differently depending on the velocity of the tape. For example, in one embodiment, the servomechanism includes a bypass route and switch. The bypass route couples the servo channel to the compensator and enables a lateral position estimate signal to be transmitted from the servo channel to the compensator, bypassing the predictor. The switch is coupled to the servo channel, the bypass route, and the predictor. The switch switches between, for example, transmitting the lateral position estimate signal y($t_k$) from the servo channel 510 to the predictor 520 to transmitting the signal y($t_k$) from the servo channel 510 to the compensator 502 via the bypass route. In this embodiment, the servomechanism is configured so that the switch is configured to transmit in one instance the lateral position estimate signal y($t_k$) along the bypass route when the tape velocity estimate signal v($t_k$) is at or above (or indicates that the velocity of the tape is at or above) a threshold velocity, and to transmit, in another instance, the same signal y($t_k$) to the predictor when the tape velocity estimate signal v($t_k$) is below (or indicates the velocity of the tape is below) the threshold velocity. In the context of this tape-drive system embodiment, the threshold velocity is the velocity at which a non-negligible tape velocity-dependent delay τ(v) is introduced, e.g., non-negligibly by the servo channel, into the lateral position estimate signal. In one embodiment, this threshold velocity is 1.6 m/s.

Accordingly, a servomechanism in accordance with certain embodiments of the invention may operate as follows: A servo signal is received from a servo reader. Based on the servo signal, a lateral position estimate is determined and a tape velocity estimate is determined. If the tape velocity estimate indicates that the tape velocity is above a threshold velocity (e.g., >2.0 m/s, >1.6 m/s, or >1.4 m/s), the lateral position estimate is transmitted (e.g., via the bypass route) to a compensator (e.g., a PID compensator). If the tape velocity estimate indicates that the tape velocity is at or below the threshold velocity (e.g., ≦2.0 m/s, ≦1.6 m/s, or ≦1.4 m/s), the lateral position estimate is transmitted to a predictor filter (e.g., a Kalman filter). The predictor filter determines a modified lateral position estimate signal that reduces or minimizes the difference, introduced by the tape velocity-dependent delay, between the modified lateral position estimate signal and an actual lateral position. The modified lateral position estimate signal is then transmitted to the compensator 502 (FIG. 5). Based on the modified lateral position estimate signal, the compensator outputs a control signal for the actuator 506, which is coupled to the servo reader 508.

As is understood from the above description, embodiments of the invention are not limited to a tape drive system. Embodiments of the invention may encompass generally a digital control system where a sensor introduces a delay in a feedback, the delay depending on an observable system parameter. For example, embodiments of the invention provide for a digital control system that includes a sensor module, a predictor filter (e.g., a Kalman filter (standard, modified, or extended), a predictor filter based on double exponential smoothing, a two dimension self-learning predictor filter, a Recursive Total Least Squares Filter, etc.) coupled to the sensor module, and a compensator coupled to the predictor filter.

The sensor module includes at least one sensor and an associated parameter module. The sensor is configured to sense an attribute of a physical object. For example, the attribute may be a position of the object. In a tape drive system, the position may be, for example, the position of a tape relative to a head module. In another application, the attribute may be, for example, a temperature of an object. The associated parameter module is configured to determine an observable system parameter associated with the physical object and affecting the attribute. For example, the associated parameter module may be configured to determine a velocity of the object. The velocity of an object affects its position. As another example, the associated parameter module may be configured to determine how long the object has been powered on or operating, which in certain systems affects the temperature of some objects.

The sensor module is configured to provide a feedback signal based on the attribute (e.g., position or temperature) and a signal representing the observable system parameter (e.g., velocity or operating time). The sensor module introduces in the feedback signal a delay dependent on the observable system parameter (e.g., velocity or operating time).

The predictor is configured to receive from the sensor module the feedback signal and the signal representing the observable system parameter. The predictor is further configured to determine a modified feedback signal that reduces or minimizes the difference, introduced by the delay dependent on the observable system parameter, between the modified feedback signal and an actual physical attribute. The predictor is configured to be adjustable, e.g., by having operating parameters that can be varied. The compensator is configured to modify a control signal u(t) based upon the modified feedback signal.

Conclusion

Thus, a digital control system having a sensor that introduces a delay in a feedback, the delay depending on an observable system parameter, is described, and in particular, a tape drive system having a track-following servomechanism with a predictor mitigating effects of delay in feedback is described. The description of embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout are not intended to mean the same method or same embodiment, unless the context clearly indicates otherwise; references to "embodiments" throughout are not intended to mean all embodiments; and references to a "module" throughout are not intended to mean the same module, unless the context clearly indicates otherwise.

As will be appreciated by one skilled in the art, aspects of embodiments of the invention may be embodied as a method, system, or computer program product. Accordingly, embodiments of the invention may take the form of an entirely hardware embodiment, or an embodiment combining software (including firmware, resident software, micro-code, etc.) and hardware aspects that may all generally be referred to herein as a "circuit," "module" or "system." Furthermore, certain aspects of embodiments of the invention may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently or in parallel, or the blocks may sometimes be executed in the reverse order, depending upon the functionality involved. Additionally, two blocks shown in parallel may, in fact, be executed sequentially, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention are described with reference to flowchart illustrations and/or block diagrams of methods, apparatus (systems) and computer program products according to embodiments of the invention. It will be understood that a block of the flowchart illustrations and/or block diagrams, or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of embodiments of the invention may be written in an object oriented programming language such as EMCA script, Smalltalk, C++ or the like. However, the computer program code for carrying out operations of embodiments of the invention may also be written in conventional procedural programming languages, such as C or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed.

Although embodiments of the invention are described with particular application to track-following servomechanisms, it should be appreciated by one of ordinary skill in the art that embodiments of the invention may also be applied more generally in digital control systems where a sensor that provides a feedback signal introduces a variable delay that depends on an observable system parameter.

Having thus described the invention of the present application in detail and by reference to embodiments thereof, it will be apparent that modifications and variations are possible without departing from the scope of the invention defined in the appended claims.

What is claimed is:

1. A track-following servomechanism for a tape drive system, the servomechanism comprising:
    an actuator coupled to a head module housing at least one servo reader, the actuator configured to actuate motion of the head module based on a control signal u(t);
    a servo channel coupled to the servo reader, the servo channel configured to receive from the servo reader a servo signal s(t) and configured to determine, based on the servo signal s(t), a lateral position estimate signal y(t) representing a lateral position estimate of the servo reader and a tape velocity estimate signal v(t) representing longitudinal velocity of a tape, wherein the servo channel introduces a tape velocity-dependent delay $\tau(v)$ into the lateral position estimate signal y(t);

a predictor filter coupled to the servo channel, the predictor filter configured to receive from the servo channel the lateral position estimate signal y(t) and the tape velocity estimate signal v(t), wherein the predictor filter determines a modified lateral position estimate signal ŷ(t) that reduces a difference, introduced by the tape velocity-dependent delay τ(v), between the modified lateral position estimate signal ŷ(t) and an actual lateral position; and a compensator coupled to the predictor filter and the actuator, the compensator configured to output the control signal u(t), wherein u(t) is based upon the modified lateral position estimate signal ŷ(t).

2. The servomechanism of claim 1, further comprising:
a bypass route coupling the servo channel to the compensator, the bypass route bypassing the predictor filter; and
a switch coupled to the servo channel, the bypass route, and the predictor filter, wherein the switch is configured to transmit the lateral position estimate signal y(t) along the bypass route when the tape velocity estimate signal v(t) indicates the velocity of the tape is at or above a threshold velocity and configured to transmit the lateral position estimate signal y(t) to the predictor filter when the tape velocity estimate signal v(t) indicates the velocity of the tape is below the threshold velocity.

3. The servomechanism of claim 2, wherein the threshold velocity is 1.6 m/s.

4. The servomechanism of claim 1, wherein the predictor filter is a Kalman filter.

5. A track-following servomechanism for a tape drive system, the servomechanism comprising:
a digital-to-analog converter (DAC) configured to receive a digital control signal $u_d(t)$, convert the digital control signal $u_d(t)$ to an analog control signal $u_a(t)$, and output the analog control signal $u_a(t)$;
an actuator coupled to the DAC and coupled to a head module housing at least one servo reader, the actuator configured to receive from the DAC the analog control signal $u_a(t)$ and to actuate motion of the head module based on the analog control signal $u_a(t)$;
a servo channel coupled to the servo reader, the servo channel configured to receive from the servo reader a servo signal s(t), and the servo channel configured to output a lateral position estimate signal y(t) representing a lateral position estimate of the servo reader and a tape velocity estimate signal v(t) representing longitudinal velocity of a tape;
a Kalman filter coupled to the servo channel, the Kalman filter configured to receive from the servo channel the lateral position estimate signal y(t) and the tape velocity estimate signal v(t), and to receive the digital control signal $u_d(t)$, and the Kalman filter configured to output an estimate of an augmented actuator state signal $\hat{x}_{aug}$ (t), and a modified lateral position estimate signal ŷ(t);
a controller coupled to the servo channel and the Kalman filter, the controller configured to receive from the servo channel the tape velocity estimate signal v(t) and receive from the Kalman filter the estimate of the augmented actuator state signal $\hat{x}_{aug}$ (t), and the controller configured to output an augmented control signal $u_{aug}(t)$;
a subtractor coupled to the Kalman filter, the subtractor configured to receive from the Kalman filter the modified lateral position estimate signal ŷ(t), and the subtractor configured to output a difference between a reference signal r(t) and the modified lateral position estimate signal ŷ(t) as a modified error signal ê(t);

a compensator coupled to the subtractor, the compensator configured to receive from the subtractor the modified error signal ê(t), and the compensator configured to output a preliminary digital control signal $t_{d0}(t)$; and
an adder coupled to the compensator, the controller, the DAC, and the Kalman filter, the adder configured to receive from the compensator the preliminary digital control signal $u_{d0}(t)$ and from the controller the augmented control signal $u_{aug}(t)$, and the adder configured to output to the DAC and to the Kalman filter the digital control signal $u_d(t)$.

6. The servomechanism of claim 5, wherein the servo channel introduces a tape velocity-dependent delay τ(v) into the lateral position estimate signal y(t), and wherein the servo channel is equivalent to a first-order low-pass filter having a variable time constant that varies based on the delay τ(v).

7. The servomechanism of claim 5, wherein the Kalman filter is further configured to determine the estimate of the augmented actuator state signal $\hat{x}_{aug}$ (t) and the modified lateral position estimate signal ŷ(t) at discrete time instants, wherein t is equal an integer k times a sampling interval T of the DAC.

8. The servomechanism of claim 7, wherein the Kalman filter is configured to determine the estimate of the augmented actuator state signal $\hat{x}_{aug}$ (t) using:

$$\hat{x}_{aug,k} = \bar{x}_{aug,k} + L(y(t_k) - H\bar{x}_{aug,k}),$$

and $$\bar{x}_{aug,k+1} = F\bar{x}_{aug,k} + Gu_k,$$

wherein $y(t_k)$ is the lateral position estimate signal from the servo channel at the discrete time instants, L is a 3×1 matrix that represents an innovation gain of the Kalman filter, F is a 3×3 matrix, G is a 3×1 matrix, and H is a 1×3 matrix, and wherein the matrices F, G, and H give a discrete-time state-space representation of the servomechanism.

9. The servomechanism of claim 5, wherein the longitudinal velocity of the tape is 0.6 m/s-1.6 m/s.

10. A method for operating a servomechanism in a tape drive system, the method comprising:
receiving a servo signal s(t) from a servo reader;
based on the servo signal s(t), determining a lateral position estimate y(t) of the servo reader;
based on the servo signal s(t), determining a velocity estimate v(t) of a tape being read by the servo reader;
identifying a tape velocity based on the velocity estimate v(t);
if the tape velocity is above a threshold velocity, feeding back the lateral position estimate y(t) to a compensator;
if the tape velocity is below the threshold velocity, wherein the threshold velocity is a velocity at which a non-negligible tape velocity-dependent delay τ(v) is introduced into the lateral position estimate signal y(t),
transmitting the lateral position estimate y(t) to a predictor filter, wherein the predictor filter determines a modified lateral position estimate signal ŷ(t) that reduces a difference, introduced by the tape velocity-dependent delay τ(v), between the modified lateral position estimate signal ŷ(t) and an actual lateral position, and
transmitting the modified lateral position estimate signal ŷ(t) to the compensator; and
outputting from the compensator a control signal for an actuator coupled to the servo reader.

11. The method of claim 10, wherein the threshold velocity is 1.6 m/s.

12. The method of claim 10, wherein the predictor filter is a Kalman filter.

13. A digital control system comprising:

a sensor module comprising at least one sensor and an associated parameter module, wherein the at least one sensor is configured to sense an attribute of a physical object, and wherein the associated parameter module is configured to determine an observable system parameter associated with the physical object and affecting the attribute, and wherein the sensor module is configured to provide a feedback signal based on the attribute and a signal representing the observable system parameter, and wherein the sensor module is to introduce in the feedback signal a delay dependent on the observable system parameter;

a predictor filter coupled to the sensor module, the predictor filter configured to receive from the sensor module the feedback signal and the signal representing the observable system parameter, wherein the predictor filter is further configured to determine a modified feedback signal that reduces a difference, introduced by the delay dependent on the observable system parameter, between the modified feedback signal and an actual physical attribute; and a compensator coupled to the predictor filter, the compensator configured to output a control signal u(t) that is based upon the modified feedback signal, wherein motion of said at least one sensor is based on the control signal u(t).

14. The system of claim 13, wherein the predictor filter is a Kalman filter.

15. The system of claim 13, wherein the attribute of the physical object is a position of the physical object and the observable system parameter associated with the physical object is a velocity of the physical object.

* * * * *